UNITED STATES PATENT OFFICE.

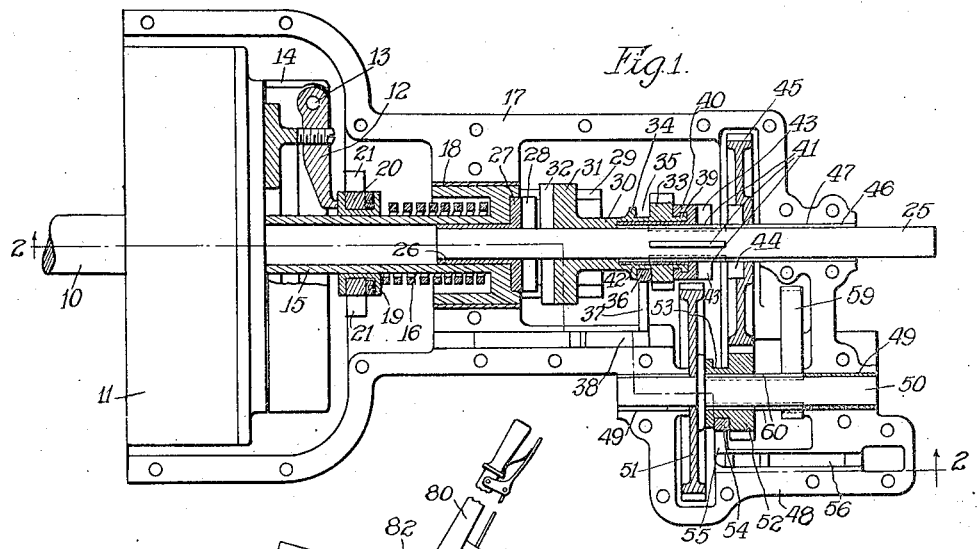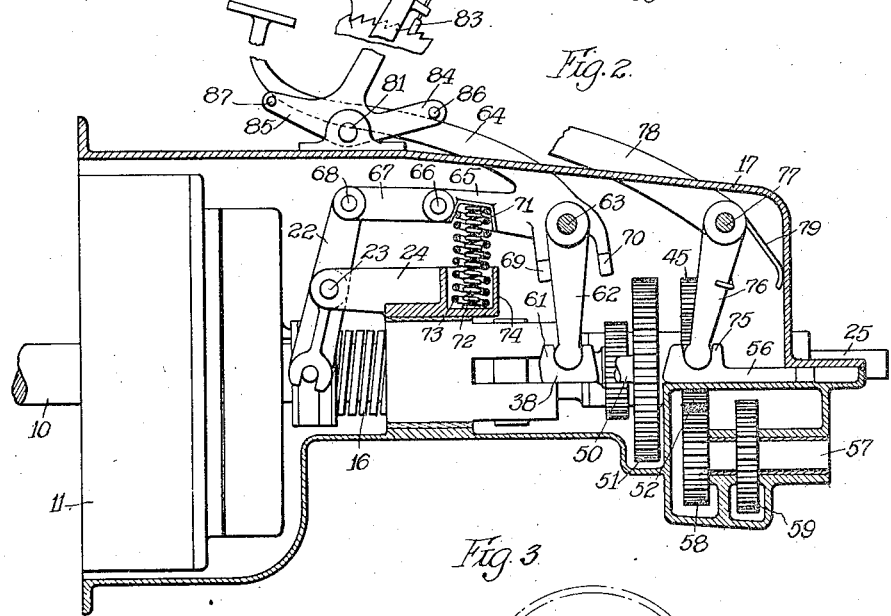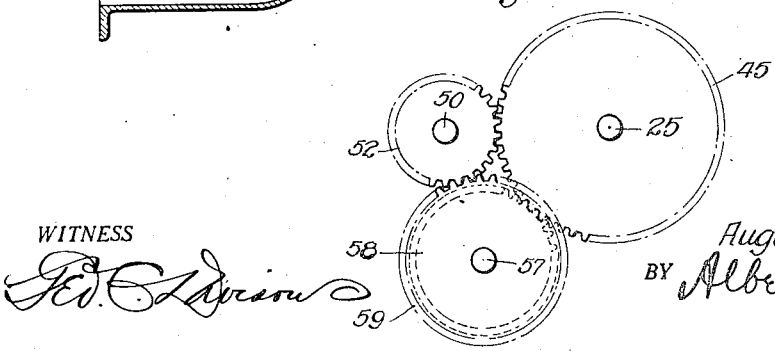

AUGUST J. MEYER, OF CHICAGO, ILLINOIS.

TRANSMISSION-GEARING.

1,356,728.　　　　Specification of Letters Patent.　　Patented Oct. 26, 1920.

Application filed June 30, 1917.　Serial No. 177,849.

*To all whom it may concern:*

Be it known that I, AUGUST J. MEYER, a citizen of the United States, residing at Chicago, in the county of Cook and State of Illinois, have invented a new and Improved Transmission-Gearing, of which the following is a specification.

My invention relates to an improved construction of transmission gearing for use on motor vehicles and is characterized by a construction by which the clutches and gears employed in securing the desired speed ratio are relieved of driving pressure before shifting from one condition of operation to another, as a result of which the wear on the clutches and gears resulting from the shifting from one operating condition to another is reduced to a minimum. Furthermore by my construction I reduce the number of working parts to a minimum, for example, for two speeds ahead and one speed on reverse I require but six gears. While my improved construction is particularly for use with small motor vehicles it is not limited to this use as it may be built in any desired size and for any desired purpose.

My invention will best be understood by reference to the accompanying drawings showing a preferred embodiment thereof in which:

Figure 1 shows the transmission mechanism in plan view and partially in horizontal sectional view taken through the axis of the driving shaft, the cover of the casing being removed to more clearly show the mechanism, Fig. 2 shows in elevation the working parts shown in Fig. 1, the casing being shown in the section taken along the broken line 2—2 in Fig. 1, and Fig. 3 is a diagrammatic end view showing the reversing gears.

Similar numerals refer to similar parts throughout the several views.

As shown in the drawings a power shaft 10 is connected with a main clutch 11 operated by a plurality of levers 12 pivotally supported at 13 by a member 14 carried by the main clutch. The sleeve 15 constitutes the shaft driven by the main clutch which hereafter will be referred to as the driving shaft of the transmission gearing. But one of the levers 12 is shown since the main clutch in and of itself forms no part of my present invention and may be of any wellknown type adapted to be set by the action of an operating spring as shown, for example at 16 in the drawings, the clutch illustrated in the drawings being of the wellknown multiple disk type. The main clutch is contained in one end of a casing 17 which provides a bearing for the outer end of the driving sleeve 15 at 18. A grooved collar 19 is mounted on the driving sleeve 15 so that it may move longitudinally thereon, and in the groove of the collar, a slip ring 20 is disposed having trunnions 21 which are engaged by the ends of a forked lever 22 pivotally supported at 23 by a bracket 24 carried by the casing. The spring 16 which is of the compression type rests at one end against the collar 19 and at the other end against an enlarged portion of the sleeve 15 and this spring is of sufficient strength to move the collar 19 to set the main clutch when the lever 22 is relieved from the strain exerted upon it in compressing the spring 16 to release the main clutch. To economize space the enlarged outer end of the sleeve 15 is provided with an annular recess to receive the end of the spring 16 and while the enlarged end of the driving sleeve is shown as made from one piece of metal it will be understood that this portion of the construction may be built up from a number of pieces of metal secured together if desired. The driven shaft 25 is provided at its outer end with a bearing carried by the casing the other end of said driven shaft having rigidly secured thereto a sleeve 26 freely rotatable in the bore of the driving sleeve 15 as a result of which the driven shaft is rotatably supported at its inner end by the bearing 18 through the intervening portion of the driving sleeve 15. The sleeve 26 has formed on its right hand end as shown in the drawings, a flange 27 which is provided with clutch jaws 28 extending axially from said flange inside of axial arms 29 projecting from the end of the enlarged portion of the right hand end of the sleeve 15. The shaft 25 carries immediately to the right of its sleeve 26 and the parts carried thereby a second sleeve 30 which is free to move longitudinally and angularly upon said shaft. The left hand end of the sleeve 30 is provided with extending arms 31 which carry clutch jaws 32 for engaging the clutch jaws 28 when the sleeve 30 is in its left hand position. The arms 31 are made so that they are a sliding fit between the edges of the arms 29 and the arms 29 are of a length to engage the arms 31 for any position of the sleeve 30 on the shaft 25 as a result of which the sleeve 30 is driven by the engagement of the arms 29 and 31 regardless of whether the sleeve 30 and the shaft 25 may be rotating at the same or different speeds. The right hand end of the sleeve 30 has rigidly secured thereto a pinion 33, which together with a flange 34 extending from the sleeve 30 forms a groove 35 for receiving a shifting yoke 36 connected by a radially extended arm 37 with a slide 38 mounted in a suitable guideway in the casing, as a result of which motion of the slide by mechanism to be described moves the sleeve 30 and parts carried thereby longitudinally on the shaft 25. Outside of the gear 33 the sleeve 30 is provided with an outwardly extending flange 39 engaging an internal groove in a collar 40 which is mounted upon the shaft 25 so as to be capable of longitudinal motion thereon but is prevented from moving angularly thereon by splines 41. To increase the bearing surface of the collar 40 on the shaft 25 it is extended to the left in the form of a sleeve 42 which is a sliding fit in a counterbore provided therefor in the right hand end of the sleeve 30. The collar 40 is provided with clutch jaws 43 for engaging similar clutch jaws 44 carried by the gear 45 which is rigidly mounted on a sleeve 46 which is a sliding fit on the shaft 25. The sleeve 46 is provided with a bearing in the casing 17 at 47, as a result of which the driven shaft is rotatably supported at its right hand end by the casing through the sleeve 46. The gear 45 and the sleeve 46 are prevented from moving longitudinally on the shaft 25 by any suitable means, for example by the ends of the splines 41. The casing 17 is provided near its right hand end with an offset portion 48 having bearings 49 for an intermediate shaft 50 which has rigidly secured thereto near its left hand end a gear 51 for meshing with the pinion 33 when the latter is in its right hand position. The shaft 50 has mounted thereon to the right of the gear 51, a pinion 52 which is longitudinally movable on the shaft 50 and is provided with an extension containing a groove 53 for the receiving of a shifting yoke 54 connected by an arm 55 with a slide 56 supported in a suitable guideway in the casing so that by motion of the slide by means to be described, the pinion 52 may be moved longitudinally on the shaft 50 into mesh with the gear 45 or out of mesh therewith as desired. The casing 17 also carries in suitable bearings below and between the shafts 25 and 50, a second intermediate shaft 57 which has rigidly secured thereto the gears 58 and 59. The gear 58 is in mesh at all times with the gear 45 and the gear 59 is adapted to mesh with the pinion 52 when the latter is moved to its right hand position as shown in the drawings. Angular motion of the pinion 52 on the shaft 50 is prevented by the splines 60 engaging the shaft and pinion as a result of which it will be observed that rotation of the shaft 50 for the position of the pinion 52 shown in the drawings rotates the gear 45 in one direction, whereas the same direction of rotation of the shaft 50 drives the gear 45 in the reverse of its first direction of motion when the pinion 52 is in its right hand position on the shaft 50. This portion of the mechanism constitutes the reversing gearing of the transmission mechanism. The relation of the reversing gears is more clearly shown diagrammatically in Fig. 3.

As shown in Fig. 2 the slide 38 is provided with jaws 61 for receiving the end of a lever 62 which is rigidly secured to a shaft 63 extending transversely across the upper portion of the casing 17. The shaft 63 also forms the pivotal support for the speed changing treadle 64 which is provided with an extending arm 65 pivotally connected at 66 with one end of a link 67 the other end of which is pivotally connected at 68 with the upper end of the lever 22. The parts are so proportioned that when the pivotal connections 66 and 68 are in line with the shaft 63 the slide 38 and parts carried thereby are in substantially their mid position and the lever 22 is in a position compressing the spring 16 so as to fully release the main clutch 11. The treadle 64 is provided below its pivotal support with lugs 69 and 70 which extend upon either side of the lever 62 with sufficient clearance between them so that when the treadle 64 is in either its lower or upper position, said treadle may be moved sufficiently from its extreme position, for which the main clutch is fully engaged, to a position permitting said clutch to slip without motion of the lever 62. The arm 65 is provided with a cup shaped extension 71 for receiving the upper ends of the springs 72 and 73, the lower ends of which rest in a cup 74 carried by the casing. These springs 72 and 73 are taken of such a strength that their combined action is sufficient when the treadle 64 is in its lowermost position to lift the treadle and parts carried thereby against the action of the spring 16 to fully release the main clutch 11 and disengage the gears and clutch jaws from their engaged relation. The spring 73 is stronger than the spring 72 and so proportioned as to assume its free position just before the pivot 66 is raised into line with the pivot 68 and the shaft 63, since comparatively small effort is required to move the pivot 66 past its mid position, after which the spring 16 tends to raise the pivot 66 and treadle 64 so as to move the slide 38 and parts carried therewith to their left hand position. From the above it will appear that with the treadle 64 either in its fully depressed position or in its uppermost position the main clutch when properly adjusted is fully set and that for motion of the treadle in either direction the lever 62 lags behind the treadle 64 as much as the clearing between the lugs 69 and 70 will permit, or in other words the initial motion of the treadle from either of its extreme positions serves to release the main clutch somewhat thus permitting it to slip before continued motion of the treadle operates the lever 62.

The slide 56 is provided with jaws 75 for receiving the lower end of a lever 76 supported on a transverse shaft 77 carried by casing 17 which shaft has rigidly secured thereto the reversing treadle 78. A spring 79 is provided for holding the reversing treadle 78 in its uppermost position which corresponds to driving the motor vehicle in its forward direction, as a result of which it will appear from the gearing above described that when the treadle 78 is depressed the reversing gearing is moved to a relation reversing the direction of motion of the driven shaft and therefore of the vehicle.

In connection with transmission mechanisms of the kind described above as illustrating my present invention it is the general practice to provide the motor vehicle with an emergency brake, which when it is in its set position places the gear shifting treadle in its middle or neutral position which is the condition of the mechanism required for starting the engine.

While my invention does not pertain specifically to any particular form of emergency brake mechanism, I have illustrated somewhat diagrammatically a portion of such a mechanism to illustrate a means for holding the gear shifting treadle in its neutral position when the apparatus is not in service and to illustrate the starting condition of the mechanism when it is desired to bring the driven shaft 25 from rest either to low speed or high speed or to reverse the direction of rotation of said driven shaft while the driving or engine shaft is continuously rotating in the same direction.

As shown in Fig. 2 an emergency brake lever 80 is shown pivotally supported at 81 from the casing 17, a ratchet segment 82 being provided to engage a spring catch 83 to hold the lever 80 in its position setting the emergency brake in a manner well-known in the art, which position is that indicated in Fig. 2. The pivot end of the lever is provided with extending arms 84 and 85 carrying projecting pins 86 and 87 which lie respectively above and below the gear shifting treadle 64. As a result of the construction described if the treadle 64 is in its upper position when the emergency brake is set it is moved to its mid position by the pin 86 and motion downwardly from its mid position is prevented by the pin 87 so as to insure that the main clutch shall be in its fully released position when the engine and shaft 10 are started and brought up to speed.

The operation of my mechanism is as follows:

Assuming that the shaft 10 is rotating at proper speed as a result of its connection with the engine, the emergency brake having first been released while the treadle 64 is held by the foot in its mid position, the treadle 64 is gradually depressed which permits the spring 16 to move the parts of the main clutch toward their clutching position and at the same time by the operation of the lever 62, the sleeve 30 is moved to the right on the shaft 25 to bring the pinion 33 into mesh with the gear 51. For this position of the treadle the driving sleeve 15 through the arms 29 and 31 rotates the pinion 33 which in turn drives the gear 51 and the latter through the shaft 50 and the pinion 52 serves to rotate the gear 45, assuming that the main clutch parts have been brought sufficiently into engagement with each other to rotate the driving sleeve 15. As a result of the relative diameters of the gears and pinions referred to and which may be substantially as indicated in the drawings the gear 45 is rotating more slowly than the sleeve 30, and the collar 40 and shaft 25 have not as yet been caused to rotate. Further downward motion of the treadle 64 moves the clutch jaws 43 sufficiently to the right to engage the clutch jaws 44 as soon as the latter are rotated into alinement with the former for which condition however the treadle 64 has not been sufficiently depressed to move the lever 22 to its position fully engaging the elements of the main clutch 11 in driving relation with each other. The collar 40 being now positively rotated by the gear 45 rotates the shaft 25 and if a considerable load is being started, the main clutch slips sufficiently to start the load. Further downward motion of the treadle 64 to bring the clutch jaws 43 and 44 into their fully engaged position serves to move the parts of the main clutch 11 to their fully set position so that a positive driving relation is established between the shaft 10 and the sleeve 15 for which condition the driven shaft is operated at low speed. To throw the transmission gearing into high speed, pressure on the treadle 64 is released for which condition the springs 72 and 73 raise the treadle, the first effect being sufficient to release the mechanism of the main clutch so that the driving sleeve is not positively operated for which condition the pressure between the clutch jaws 43 and 44 is reduced practically to zero at which time, however, the lever 62 has not as yet been operated to disengage the clutch jaws 43 and 44 as a result of the clearance between the lug 70 and the lever 62. When the lug 70 engages the lever 62 to remove the clutch jaws 43 from engagement with the clutch jaws 44 and the pinion 33 from engagement with the gear 51 the driving force communicated to the driving sleeve 15 is so small that this disengagement of the parts referred to is readily effected without serious friction or wear.

Further upward movement of the treadle 64 after disengagement of the clutch jaws and gears referred to, moves the clutch jaws 32 and 28 into engagement with each other which engagement begins before the treadle 64 is in a sufficiently raised position to fully set the main clutch 11, as a result of which the main clutch may slip to relieve the strain accompanying the engagement of the jaws 32, which are revolving at relative high speed, with the jaws 28, which are revolving at relative low speed. Continued upward motion of the treadle 64 serves to fully set the main clutch through the action of the spring 16 as a result of which the driven shaft 25 is brought gradually from low speed to high speed through the slip of the main clutch thus eliminating the shock which would otherwise accompany the engagement of the jaws 28 and 32. For this condition of the mechanism it will be seen that the shaft 25 is driven directly from the sleeve 30 through the engagement of the clutch jaws 28 and 32.

When it is desired to disengage the clutch jaws 28 and 32 or in other words to release the engine from the load, the first portion of the downward movement of the treadle 64 operates the lever 22 nearly enough to disengage the parts of the main clutch before the lever 62 is operated as a result of the clearance at that time existing between the lug 69 and the lever 62. There is therefore at the time of operating the lever 62 little driving force exerted on the driving sleeve 15 and the clutch jaws 28 and 32 are readily disengaged from each other without serious friction and wear. The difference in the strengths of the springs 72 and 73 is preferably sufficient so that when the treadle 64 is being moved downwardly its engagement with the spring 73 affords the operator an indication of when the treadle is in substantially its mid position.

When it is desired to rotate the shaft 25 in a reverse direction, the treadle 64 is first permitted to assume its mid position and the treadle 78 is moved to its depressed position thus changing the operating relation of the reversing gears above referred to, for which condition of the treadle 78 the treadle 64 is depressed in the same manner as above described for establishing a low forward speed of the shaft 25, the only difference now being that as a result of the reversed relation of the reversing gearing the shaft 25 is now caused to rotate at a low speed in a direction the reverse of that previously caused at low speed. As a result of the construction and operation above described it will be observed that I have provided a transmission mechanism in which the gears are relieved of load when they are being shifted into engaging relation with each other and that therefore there is no danger whatever of damaging the gears by shifting them into driving relation, and furthermore that at the time of engagement or disengagement of any of the clutch jaws the driving force is small and therefore the effort required to move the clutch jaws into engagement with each other or to disengage them from each other is a minimum and wear on the clutch jaws as well as on the devices involved in shifting the jaws into and from either driving condition is reduced to a minimum. It will also be observed that when the parts are in a position driving the shaft 25 at high speed, there are no driven gears in my mechanism, since for this condition the pinion 33 is entirely disengaged from the remaining gearing.

While I have shown my invention in the particular embodiment above described it will be understood that I do not limit myself to this exact construction as I may employ equivalents thereof known to the art at the time of the filing of this application without departing from the scope of the appended claims.

What I claim is:

1. In a transmission mechanism, the combination of a power shaft, a driving shaft, a driven shaft, a main clutch between said power shaft and said driving shaft, two sets of clutch members for driving said driven shaft from said driving shaft, and a common operating mechanism for setting said main clutch and engaging either set of said clutch members when said main clutch is but partly set, continued motion of said operating mechanism serving to fully set said main clutch.

2. In a transmission mechanism, the combination of a power shaft, a driving shaft, a driven shaft, a main clutch between said power shaft and said driving shaft, two sets of clutch members for driving said driven shaft from said driving shaft, and a common operating mechanism for setting said main clutch and engaging either set of said clutch members when said main clutch is but partly set, continued motion of said operating mechanism serving to fully set said main clutch, and motion of said operating mechanism in the reverse direction partially disengaging said main clutch before moving said clutch members relatively to each other, continued motion of said operating mechanism in said reversed direction serving to disengage said main clutch and separate said clutch members from each other.

3. In a transmission mechanism, the combination of a power shaft, a driving shaft, a driven shaft, a main clutch between said power shaft and said driving shaft, two sets of clutch members for driving said driven shaft from either set of said driving shaft, and a common operating mechanism for setting said main clutch and engaging said clutch members, said operating mechanism comprising a treadle, a first element connecting said treadle and the main clutch, and a second element connecting said first element and one of each set of said clutch members, there being a delayed engagement between said first and second elements whereby the operation of said second element lags behind the operation of said first element.

4. In a transmission mechanism, the combination of a power shaft, a driving shaft, a driven shaft, a main clutch between said power shaft and said driving shaft, two sets of clutch members for driving said driven shaft from said driving shaft, and a common operating mechanism for setting said main clutch and engaging either set of said clutch members, said operating mechanism comprising a treadle and two operating trains, one train extending from said treadle to said main clutch and the other train extending from said treadle to one of each set of said clutch members, there being a slip in said second train, whereby operation of said treadle operates said main clutch before operating said clutch members.

5. In a transmission mechanism, the combination of a power shaft, a driving shaft, a driven shaft, a main clutch between said power shaft and said driving shaft, two sets of clutch members for driving said driven shaft from said driving shaft, and a common operating mechanism for setting said main clutch and engaging either set of said clutch members, said operating mechanism comprising a treadle and two operating trains, one train extending from said treadle to said main clutch and the other train extending from said treadle to one of each set of said clutch members, there being a slip in said second train, whereby operation of said treadle in either direction operates said main clutch before operating said clutch members.

6. In a transmission mechanism, the combination of a power shaft, a driving shaft, a driven shaft, a main clutch between said power shaft and said driving shaft, clutch members for driving said driven shaft from said driving shaft, and a common operating mechanism for setting said main clutch and engaging said clutch members, said operating mechanism comprising a treadle, a first lever connected with said main clutch, a second lever connected with said treadle, a link connecting said levers, a third lever connected with one of said clutch members and free from said treadle, and lugs carried by said treadle for engaging said third lever, there being a clearance between said lugs and said third lever.

7. In a transmission mechanism, the combination of a power shaft, a driving shaft, a driven shaft, a main clutch between said power shaft and said driving shaft, clutch members for driving said driven shaft from said driving shaft, a common operating mechanism for setting said main clutch and engaging said clutch members, said operating mechanism comprising a treadle, a first lever connected with said main clutch, a second lever connected with said treadle, a link connecting said levers, a third lever connected with one of said clutch members and free from said treadle, and lugs carried by said treadle for engaging said third lever, there being a clearance between said lugs and said third lever, a first spring tending to set said main clutch and move said second lever to both of its extreme positions, and a second spring maintaining said treadle in its upper position against the action of said first spring when said treadle is free from restraining force.

8. In a transmission mechanism, the combination of a power shaft, a driving shaft, a driven shaft, a main clutch between said power shaft and said driving shaft, clutch members for driving said driven shaft from said driving shaft, a common operating mechanism for setting said main clutch and engaging said clutch members when said main clutch is but partly set, continued motion of said operating mechanism serving to fully set said main clutch, and reducing gearing between said driving and said driven shafts.

9. In a transmission mechanism, the combination of a power shaft, a driving shaft, a driven shaft, a main clutch between said power shaft and said driving shaft, clutch members for driving said driven shaft from said driving shaft, a common operating mechanism for setting said main clutch and engaging said clutch members when said main clutch is but partly set, continued motion of said operating mechanism serving to fully set said main clutch, and motion of said operating mechanism in the reverse direction partially disengaging said main clutch before moving said clutch members relatively to each other, continued motion of said operating mechanism in said reversed direction serving to disengage said main clutch and separate said clutch members from each other, and reducing gearing between said driving and said driven shafts.

10. In a transmission mechanism, the combination of a power shaft, a driving shaft, a driven shaft, a main clutch between said power shaft and said driving shaft, two sets of clutch members for driving said driven shaft from said driving shaft, a common operating mechanism for setting said main clutch and engaging either set of said clutch members, said operating mechanism comprising a treadle, a first element connecting said treadle and the main clutch, and a second element connecting said first element and one of each set of said clutch members, there being a delayed engagement between said first and second elements whereby the operation of said second element lags behind the operation of said first element, and reducing gearing between said driving and said driven shafts.

11. In a transmission mechanism, the combination of a power shaft, a driving shaft, a driven shaft, a main clutch between said power shaft and said driving shaft, two sets of clutch members for driving said driven shaft from said driving shaft, a common operating mechanism for setting said main clutch and engaging either set of said clutch members, said operating mechanism comprising a treadle and two operating trains, one train extending from said treadle to said main clutch and the other train extending from said treadle to one of each set of said clutch members, there being a slip in said second train, whereby operation of said treadle operates said main clutch before operating said clutch members, and reducing gearing between said driving and said driven shafts.

12. In a transmission mechanism, the combination of a power shaft, a driving shaft, a driven shaft, a main clutch between said power shaft and said driving shaft, two sets of clutch members for driving said driven shaft from said driving shaft, a common operating mechanism for setting said main clutch and engaging either set of said clutch members, said operating mechanism comprising a treadle and two operating trains, one train extending from said treadle to said main clutch and the other train extending from said treadle to one of each set of said clutch members, there being a slip in said second train, whereby operation of said treadle in either direction operates said main clutch before operating said clutch members, and reducing gearing between said driving and said driven shafts.

13. In a transmission mechanism, the combination of a power shaft, a driving shaft, a driven shaft, a main clutch between said power shaft and said driving shaft, clutch members for driving said driven shaft from said driving shaft, a common operating mechanism for setting said main clutch and engaging said clutch members, said operating mechanism comprising a treadle, a first lever connected with said main clutch, a second lever connected with said treadle, a link connecting said levers, a third lever connected with one of said clutch members and free from said treadle, and lugs carried by said treadle for engaging said third lever, there being a clearance between said lugs and said third lever, and reducing gearing between said driving and said driven shafts.

14. In a transmission mechanism, the combination of a power shaft, a driving shaft, a driven shaft, a main clutch between said power shaft and said driving shaft, clutch members for driving said driven shaft from said driving shaft, a common operating mechanism for setting said main clutch and engaging said clutch members, said operating mechanism comprising a treadle, a first lever connected with said main clutch, a second lever connected with said treadle, a link connecting said levers, a third lever connected with one of said clutch members and free from said treadle, and lugs carried by said treadle for engaging said third lever, there being a clearance between said lugs and said third lever, a first spring tending to set said main clutch and move said second lever to both of its extreme positions, a second spring maintaining said treadle in its upper position against the action of said first spring when said treadle is free from restraining force, and reducing gearing between said driving and said driven shafts.

15. In a transmission mechanism, the combination of a power shaft, a driving shaft, a driven shaft, a main clutch between said power shaft and said driving shaft, clutch members for driving said driven shaft from said driving shaft, a common operating mechanism for setting said main clutch and engaging said clutch members when said main clutch is but partly set, continued motion of said operating mechanism serving to fully set said main clutch, reducing gearing between said driving and said driven shafts, and a second set of clutch members for driving said driven shaft from said driving shaft in a one to one ratio, one of the clutch members of said second set being connected with and operated by said operating mechanism.

16. In a transmission mechanism, the combination of a power shaft, a driving shaft, a driven shaft, a main clutch between said power shaft and said driving shaft, clutch members for driving said driven shaft from said driving shaft, a common operating mechanism for setting said main clutch and engaging said clutch members when said main clutch is but partly set, continued motion of said operating mechanism serving to fully set said main clutch, and motion of said operating mechanism in the reverse direction partially disengaging said main clutch before moving said clutch members relatively to each other, continued motion of said operating mechanism in said reversed direction serving to disengage said main clutch and separate said clutch members from each other, reducing gearing between said driving and said driven shafts, and a second set of clutch members for driving said driven shaft from said driving shaft in a one to one ratio, one of the clutch members of said second set being connected with and operated by said operating mechanism, motion in said first direction serving to disengage said second set of clutch members, and motion in said reversed direction serving to engage said second set of clutch members.

17. In a transmission mechanism, the combination of a power shaft, a driving shaft, a driven shaft, a main clutch between said power shaft and said driving shaft, clutch members for driving said driven shaft from said driving shaft, a common operating mechanism for setting said main clutch and engaging said clutch members, said operating mechanism comprising a treadle, a first element connecting said treadle and the main clutch, and a second element connecting said first element and one of said clutch members, there being a delayed engagement between said first and second elements whereby the operating of said second element lags behind the operation of said first element, reducing gearing between said driving and said driven shafts, and a second set of clutch members for driving said driven shaft from said driving shaft in a one to one ratio, one of the clutch members of said second set being connected with and operated by said second element.

18. In a transmission mechanism, the combination of a power shaft, a driving shaft, a driven shaft, a main clutch between said power shaft and said driving shaft, clutch members for driving said driven shaft from said driving shaft, a common operating mechanism for setting said main clutch and engaging said clutch members, said operating mechanism comprising a treadle and two operating trains, one train extending from said treadle to said main clutch and the other train extending from said treadle to one of said clutch members, there being a slip in said second train, whereby operation of said treadle operates said main clutch before operating said clutch members, reducing gearing between said driving and said driven shafts, and a second set of clutch members for driving said driven shaft from said driving shaft in a one to one ratio, one of the clutch members of said second set being connected with and operated by said second train.

19. In a transmission mechanism, the combination of a power shaft, a driving shaft, a driven shaft, a main clutch between said power shaft and said driving shaft, clutch members for driving said driven shaft from said driving shaft, a common operating mechanism for setting said main clutch and engaging said clutch members, said operating mechanism comprising a treadle and two operating trains, one train extending from said treadle to said main clutch and the other train extending from said treadle to one of said clutch members, there being a slip in said second train, whereby operation of said treadle in either direction operates said main clutch before operating said clutch members, reducing gearing between said driving and said driven shafts, and a second set of clutch members for driving said driven shaft from said driving shaft in a one to one ratio, one of the clutch members of said second set being connected with and operated by said second train.

20. In a transmission mechanism, the combination of a power shaft, a driving shaft, a driven shaft, a main clutch between said power shaft and said driving shaft, clutch members for driving said driven shaft from said driving shaft, a common operating mechanism for setting said main clutch and engaging said clutch members, said operating mechanism comprising a treadle, a first lever connected with said main clutch, a second lever connected with said treadle, a link connecting said levers, a third lever connected with one of said clutch members and free from said treadle, and lugs carried by said treadle for engaging said third lever, there being a clearance between said lugs and said third lever, reducing gearing between said driving and said driven shafts, and a second set of clutch members for driving said driven shaft from said driving shaft in a one to one ratio, one of the clutch members of said second set being connected with and operated by said third lever.

21. In a transmission mechanism, the combination of a power shaft, a driving shaft, a driven shaft, a main clutch between said power shaft and said driving shaft, clutch members for driving said driven shaft from said driving shaft, a common operating mechanism for setting said main clutch and engaging said clutch members, said operating mechanism comprising a treadle, a first lever connected with said main clutch, a second lever connected with said treadle, a link connecting said levers, a third lever connected with one of said clutch members and free from said treadle, and lugs carried by said treadle for engaging said third lever, there being a clearance between said lugs and said third lever, a first spring tending to set said main clutch and move said second lever to both of its extreme positions, a second spring maintaining said treadle in its upper position against the action of said first spring when said treadle is free from restraining force, reducing gearing between said driving and said driven shafts, and a second set of clutch members for driving said driven shaft from said driving shaft in a one to one ratio, one of the clutch members of said second set being connected with and operated by said third lever.

22. In a transmission gearing, the combination of a power shaft, a driving shaft, a driven shaft, a main clutch between said power shaft and said driving shaft, a treadle having upper, lower and middle operating positions, devices between said treadle and said clutch for setting said clutch for the upper and lower positions of said treadle and releasing said clutch for the middle position thereof, clutch members between said driving and said driven shafts, and devices between said treadle and one of said clutch members for engaging said clutch members by motion of said treadle to its lower position before said main clutch is wholly set.

23. In a transmission gearing, the combination of a power shaft, a driving shaft, a driven shaft, a main clutch between said power shaft and said driving shaft, a treadle having upper, lower and middle operating positions, devices between said treadle and said clutch for setting said clutch for the upper and lower positions of said treadle and releasing said clutch for the middle position thereof, clutch members between said driving and said driven shafts, and devices between said treadle and one of said clutch members for engaging said clutch members by motion of said treadle to its lower position before said main clutch is wholly set, there being lost motion in said last named devices permitting said treadle to leave its lower position to partially release said main clutch before moving the connected clutch member, continued motion of said treadle to its middle position serving to disengage said clutch members.

24. In a transmission gearing, the combination of a power shaft, a driving shaft, a driven shaft, a main clutch between said power shaft and said driving shaft, a treadle having upper, lower and middle operating positions, devices between said treadle and said clutch for setting said clutch for the upper and lower positions of said treadle and releasing said clutch for the middle position thereof, clutch members between said driving and said driven shafts, devices between said treadle and one of said clutch members for engaging said clutch members by motion of said treadle to its lower position before said main clutch is wholly set, there being lost motion in said last named devices permitting said treadle to leave its lower position to partially release said main clutch before moving the connected clutch member, continued motion of said treadle to its middle position serving to disengage said clutch members, reducing gears between said driving and said driven shafts controlled by said clutch members, a second set of clutch members between said driving and said driven shafts, and connections between one of said second set of clutch members and said last mentioned devices whereby motion of said treadle to its upper position engages said second set of clutch members.

25. In a transmission gearing, the combination of a main clutch, two sets of driving clutch members, and operating means connected with said main clutch and one of each set of said clutch members for relieving the pressure on the main clutch during engagement of either set of said clutch members.

26. In a transmission gearing, the combination of a main clutch, two sets of driving clutch members, and operating means connected with said main clutch and one of each set of said clutch members for relieving the pressure on the main clutch during engagement and disengagement of either set of said clutch members.

27. In a transmission gearing, the combination of a main clutch, a low speed train, a high speed train, a set of clutch members for each train, and operating means connected with said main clutch and one of the clutch members of each set for relieving the pressure on the main clutch during engagement of the clutch members of either set.

28. In a transmission gearing, the combination of a main clutch, a low speed train, a high speed train, a set of clutch members for each train, and operating means connected with said main clutch and one of the clutch members of each set for relieving the pressure on the main clutch during engagement and disengagement of the clutch members of either set.

29. In a transmission gearing, the combination of a main clutch, reducing gears, two sets of driving clutch members, and operating means connected with said main clutch each set of said clutch members and said gears for relieving the pressure on the main clutch during the engaging of said gears with each other and during the disengaging of said gears from each other and during engagement of either set of said clutch members.

30. In a transmission gearing, the combination of a main clutch, reducing gears, driving clutch members, and operating means connected with said main clutch and said gears for relieving the pressure on the main clutch during engagement and disengagement of said gears and of said clutch members.

31. In a transmission gearing, the combination of a driving shaft, a driven shaft, a pinion rotatable with the driving shaft, a clutch member rotatable with the driven shaft, and a connection between said pinion and said clutch member preventing axial motion and permitting angular motion of one of said parts relatively to the other.

32. In a transmission gearing, the combination of a driving shaft, a driven shaft, a pinion rotatable with the driving shaft, a clutch member rotatable with the driven shaft, and a connection between said pinion and said clutch member preventing axial motion and permitting angular motion of one of said parts relatively to the other, said parts being supported by said driven shaft, said pinion being movable angularly and longitudinally on said shaft and said clutch member being capable of longitudinal motion only on said shaft.

33. In a transmission gearing, the combination of a driving shaft, a driven shaft, a pinion rotatable with the driving shaft, a clutch member rotatable with the driven shaft, a connection between said pinion and said clutch member preventing axial motion and permitting angular motion of one of said parts relatively to the other, said parts being supported by said driven shaft, said pinion being movable angularly and longitudinally on said shaft and said clutch member being capable of longitudinal motion only on said shaft, a second clutch member rigidly secured to said pinion, and a third clutch member secured to said driven shaft for engaging said second clutch member.

34. In a transmission gearing, the combination of a driving shaft, a driven shaft, a pinion rotatable with the driving shaft, a clutch member rotatable with the driven shaft, a connection between said pinion and said clutch member preventing axial motion and permitting angular motion of one of sail parts relatively to the other, said parts being supported by said driven shaft, said pinion being movable angularly and longitudinally on said shaft and said clutch member being capable of longitudinal motion only on said shaft, a second clutch member rigidly secured to said pinion, a third clutch member secured to said driven shaft for engaging said second clutch member, a train of gears for engaging said pinion, one of the gears of said train being rotatable on said driven shaft, and a fourth clutch member carried by said gear for engaging the first mentioned clutch member.

35. In a transmission gearing, the combination of a driving shaft, a driven shaft, a pinion rotatable with the driving shaft, a clutch member rotatable with the driven shaft, a connection between said pinion and said clutch member preventing axial motion and permitting angular motion of one of said parts relatively to the other, said parts being supported by said driven shaft, said pinion being movable angularly and longitudinally on said shaft and said clutch member being capable of longitudinal motion only on said shaft, a second clutch member rigidly secured to said pinion, a third clutch member secured to said driven shaft for engaging said second clutch member, a train of gears for engaging said pinion, one of the gears of said train being rotatable on said driven shaft, a fourth clutch member carried by said gear for engaging the first mentioned clutch member, reversing gears, and means for including said reversing gears in said train of gears.

36. In a transmission mechanism, the combination of a power shaft, a driving shaft, a driven shaft, a main clutch between said power shaft and said driving shaft, two sets of clutch members for driving said driven shaft from said driving shaft, a common operating mechanism for setting said main clutch and engaging either set of said clutch members when said main clutch is but partly set, continued motion of said operating mechanism serving to fully set said main clutch, reversing gears, and means for connecting said driving shaft with said driven shaft through said reversing gears.

37. In a transmission mechanism, the combination of a power shaft, a driving shaft, a driven shaft, a main clutch between said power shaft and said driving shaft, two sets of clutch members for driving said driven shaft from said driving shaft, a common operating mechanism for setting said main clutch and engaging either set of said clutch members when said main clutch is but partly set, continued motion of said operating mechanism serving to fully set said main clutch, reducing gearing between said driving and said driven shafts, reversing gears, and means for connecting said driving shaft with said driven shaft through said reversing gears.

38. In a transmission gearing, the combination of a power shaft, a driving shaft, a driven shaft, a main clutch between said power shaft and said driving shaft, a treadle having upper, lower and middle operating positions, devices between said treadle and said clutch for setting said clutch for the upper and lower positions of said treadle and releasing said clutch for the middle position thereof, clutch members between said driving and said driven shafts, devices between said treadle and said clutch members for engaging said clutch members by motion of said treadle to its lower position before said main clutch is wholly set, reversing gears, and menas for connecting said driving shaft with said driven shaft through said reversing gears.

In witness whereof, I hereunto subscribe my name this 22nd day of June, A. D. 1917.

AUGUST J. MEYER.